(12) United States Patent
Alanis et al.

(10) Patent No.: US 10,627,906 B2
(45) Date of Patent: Apr. 21, 2020

(54) TACTILE DISPLAY USING MICROSCALE ELECTROSTATIC ACCELERATORS

(71) Applicant: International Business Machines Corporation, Armonk, NY (US)

(72) Inventors: Francisco J. Alanis, Cedar Park, TX (US); Edgar Cantu, Austin, TX (US); Maria D. Garza, Round Rock, TX (US); Carlos F. Gomez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/612,099

(22) Filed: Jun. 2, 2017

(65) Prior Publication Data

US 2018/0348866 A1    Dec. 6, 2018

(51) Int. Cl.
    *G06F 3/01*    (2006.01)
    *G06F 3/0481*  (2013.01)
    *G09B 21/00*   (2006.01)

(52) U.S. Cl.
    CPC .......... *G06F 3/016* (2013.01); *G06F 3/04815* (2013.01); *G09B 21/003* (2013.01)

(58) Field of Classification Search
    CPC .... G06F 3/016; G06F 3/04815; G09B 21/003
    See application file for complete search history.

(56) References Cited

U.S. PATENT DOCUMENTS

| 8,547,339 | B2 * | 10/2013 | Ciesla | ................... | G06F 3/0202 |
| | | | | | 345/156 |
| 9,098,141 | B2 | 8/2015 | Ciesla et al. | | |
| 9,405,369 | B2 | 8/2016 | Modarres et al. | | |
| 9,557,915 | B2 * | 1/2017 | Ciesla | ................. | G06F 3/04886 |
| 9,760,172 | B2 * | 9/2017 | Ray | ...................... | G06F 3/04886 |
| 2003/0117371 | A1 * | 6/2003 | Roberts | ................... | G06F 3/014 |
| | | | | | 345/156 |
| 2005/0007726 | A1 * | 1/2005 | Schlitz | .................... | F04B 17/00 |
| | | | | | 361/330 |
| 2005/0173231 | A1 * | 8/2005 | Gonzales | ................. | G08B 6/00 |
| | | | | | 200/5 R |
| 2008/0055248 | A1 | 3/2008 | Tremblay et al. | | |

(Continued)

OTHER PUBLICATIONS

"Electrostatic fluid accelerator", Wikipedia, https://en.wikipedia.org/wiki/Electrostatic_fluid_accelerator, retrieved from the internet Mar. 9, 2017, 6 pages.

(Continued)

*Primary Examiner* — Tom V Sheng
(74) *Attorney, Agent, or Firm* — Francis Lammes; Stephen J. Walder, Jr.; Alexander G. Jochym

(57) ABSTRACT

A mechanism is provided for virtually rendering a portion of a three-dimensional (3D) object to a user via a tactile display. The mechanism receives a selection of the 3D object to be virtually rendered to a user. The mechanism identifies a subset of cells of a plurality of cells that form the tactile display required to virtually render a portion of the 3D object that will be virtually contacted by the tactile display. The mechanism selectively controls a fluid flow to the subset of cells that form the tactile display to render a sensation associated with the portion of the 3D object on skin of the user wearing the tactile display, wherein the fluid flow to each cell the subset of cells is provided via one or more electrostatic accelerator pumps.

20 Claims, 4 Drawing Sheets

(56) References Cited

U.S. PATENT DOCUMENTS

| | | | | |
|---|---|---|---|---|
| 2008/0248247 | A1* | 10/2008 | Caine | G06F 3/016 428/152 |
| 2008/0248248 | A1* | 10/2008 | Caine | G06F 1/1616 428/152 |
| 2008/0248836 | A1* | 10/2008 | Caine | G06F 1/1616 455/566 |
| 2008/0287167 | A1* | 11/2008 | Caine | G06F 1/1616 455/575.1 |
| 2009/0002328 | A1* | 1/2009 | Ullrich | G06F 3/0414 345/173 |
| 2009/0015560 | A1* | 1/2009 | Robinson | G06F 3/016 345/168 |
| 2009/0128376 | A1* | 5/2009 | Caine | H04M 1/23 341/34 |
| 2009/0132093 | A1* | 5/2009 | Arneson | G06F 1/1616 700/282 |
| 2011/0018813 | A1* | 1/2011 | Kruglick | G06F 3/016 345/173 |
| 2012/0268412 | A1 | 10/2012 | Cruz-Hernandez et al. | |
| 2016/0202761 | A1* | 7/2016 | Bostick | G06F 3/016 345/174 |
| 2016/0209639 | A1 | 7/2016 | Progler | |
| 2016/0238040 | A1* | 8/2016 | Gallo | A61B 34/76 |
| 2017/0068318 | A1* | 3/2017 | McClure | G06F 3/016 |
| 2017/0123499 | A1 | 5/2017 | Eid | |
| 2018/0157317 | A1* | 6/2018 | Richter | G06F 3/011 |

OTHER PUBLICATIONS

Chouvardas, V.G. et al., "Tactile displays: Overview and recent advances", Elsevier B.V., http://citeseerx.ist.psu.edu/viewdoc/download?doi=10.1.1.449.1398&rep=rep1&type=pdf, Displays 29, No. 3, Jul. 10, 2007, pp. 185-194.

Culjat, Martin et al., "Pneumatic balloon actuators for tactile feedback in robotic surgery", Emerald Group Publishing Limited, http://www.emeraldinsight.com/doi/abs/10.1108/01439910810893617, (month unknown) 2008, 3 pages.

Gupta, Sidhant et al., "AirWave: Non-Contact Haptic Feedback Using Air Vortex Rings", ACM, UbiComp '13, Zurich, Switzerland, Sep. 8-12, 2013, 10 pages.

Krichtafovitch, I.A. et al., "Electrostatic Fluid Accelerator and Air Purifier—The Second Wind", University of Washington, Department of Electrical Engineering, https://www.ee.washington.edu/research/seal/pubfiles/Krichtafovitch_ESA_June_05.pdf, Jun. 2005, 13 pages.

Moy, Gabriel et al., "Human Psychophysics for Teletaction System Design", Haptics-e, The electronic journal of haptics research, http://www.haptics-e.org/Vol_01/he-v1n3.pdf, Feb. 18, 2000, 20 pages.

Schlitz, Daniel J., "Microscale ion driven air flow", Purdue University, http://docs.lib.purdue.edu/dissertations/AAI3150828/, Dissertation, Abstract only, Nov. 30, 2005, 2 pages.

Starr, Michelle, "Ultrasound creates a haptic shape that can be seen and felt", CNET, https://www.cnet.com/news/ultrasound-creates-a-haptic-shape-that-can-be-seen-and-felt/, Dec. 2, 2014, 9 pages.

* cited by examiner

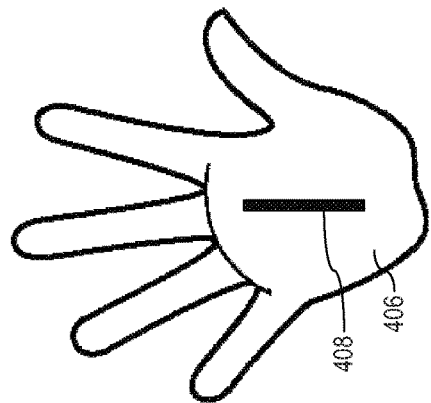
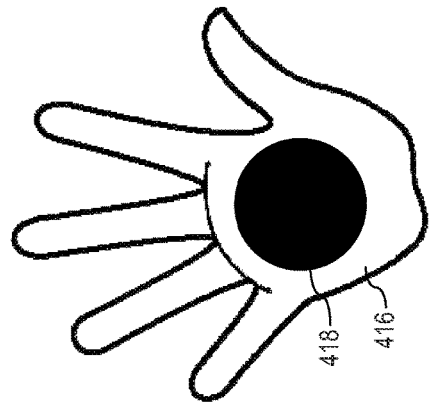
FIG. 4A
FIG. 4B
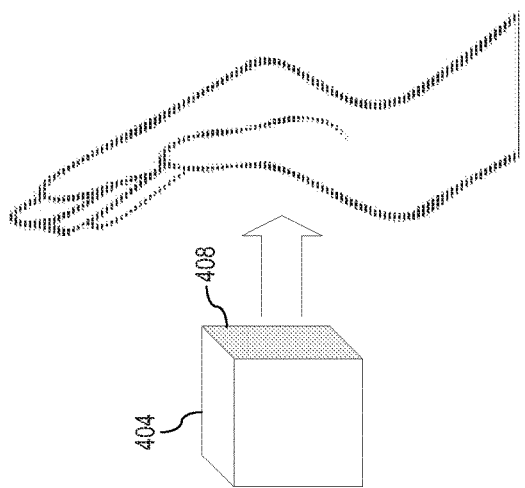
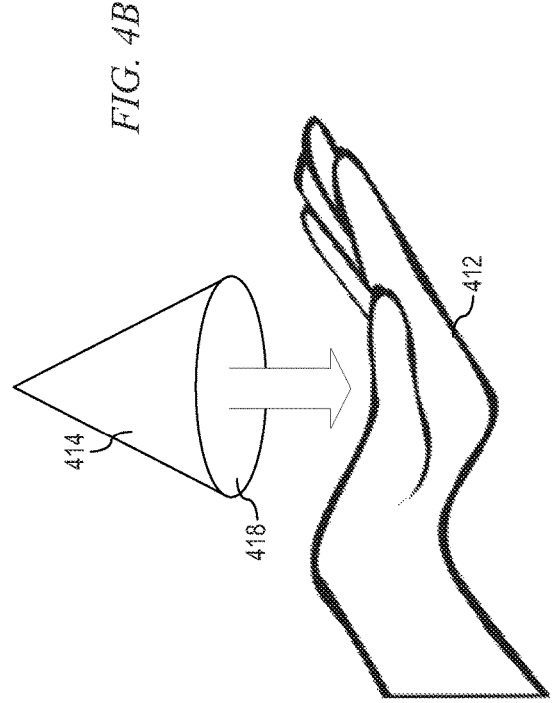

TACTILE DISPLAY USING MICROSCALE ELECTROSTATIC ACCELERATORS

BACKGROUND

The present application relates generally to an improved data processing apparatus and method and more specifically to mechanisms for a tactile display using electrostatic accelerators.

Tactation is the sensation perceived by the sense of touch and is based on the skin's receptors. Touch is a common medium used by the general population and the sensory impaired. Tactile substitution may be used by the blind or deaf in order to enhance access to computer graphical user interfaces, enhance mobility in controlled environments, or the like. Skin nerves may be stimulated through six types of receptors by mechanical, electrical, or thermal stimuli. Modalities, such as vibration and pressure, may stimulate these receptors. Advances in tactile communication using implementations of the actuating devices have been developed via several new technologies. These technologies include static or vibrating pins, focused ultrasound, electrical stimulation, surface acoustic waves, and others.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for virtually rendering a portion of a three-dimensional (3D) object to a user via a tactile display. The illustrative embodiments receive a selection of the 3D object to be virtually rendered to a user. The illustrative embodiments identify a subset of cells of a plurality of cells that form the tactile display required to virtually render a portion of the 3D object that will be virtually contacted by the tactile display. The illustrative embodiments selectively control a fluid flow to the subset of cells that form the tactile display to render a sensation associated with the portion of the 3D object on skin of the user wearing the tactile display, wherein the fluid flow to each cell the subset of cells is provided via one or more electrostatic accelerator pumps.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a tactile display is provided. The tactile display may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B depict examples of the illusions presented to a user of holding a virtual 3D object in accordance with the illustrative embodiments.

DETAILED DESCRIPTION

Figure 1:
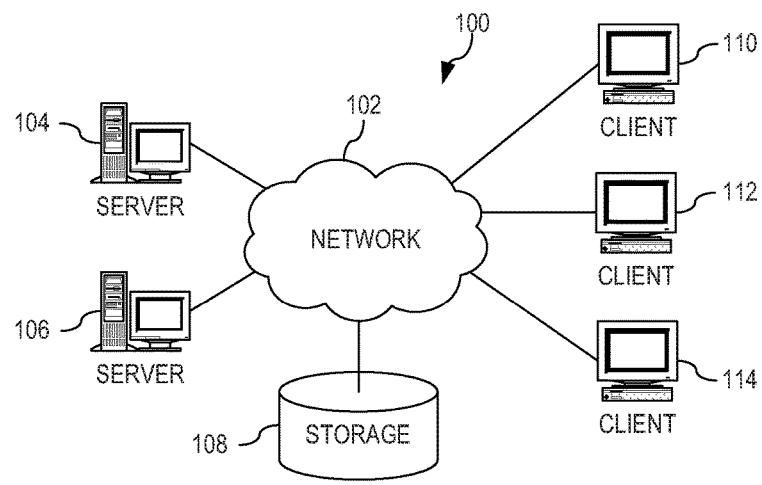
FIG. 1 is an example diagram of a distributed data processing system in which aspects of the illustrative embodiments may be implemented.

The illustrative embodiments provide mechanisms for a tactile display using electrostatic accelerators. As noted above, current tactile communications, also referred to as tactile display interface, use actuating devices, such as static or vibrating pins, focused ultrasound, electrical stimulation, surface acoustic waves, and others. However, a problem encountered during the development of such a tactile display interface is that the maximum resolution that may be reached with current solutions based on servo vibrations, ultrasonic vibrations, remote vibrations through controlled air compressions, or the like, is too low. Another problem is that these tactile display interfaces become too cumbersome and heavy in an attempt to reach a higher resolution.

The illustrative embodiments provide mechanisms for a tactile display using electrostatic accelerators. The tactile display comprises a mesh with a plurality of cells segmented into grids, each grid with its own microscopic scale ionic air pump (MSIAP), hereinafter referred to as an electrostatic accelerator, that provides for an individual control of the flow of air to each cell in the grid via a pneumatic tube. A controller of the tactile display is then coupled to each electrostatic accelerator thereby providing individual access to each cell on the grid, thereby providing a manipulation of fluid flow properties such as state, intensity, duration, and pulse frequency of air flow through individual cells simultaneously. By coordinating fluid flow through multiple individual cells, nerve endings in skin to which the mesh is applied are then stimulated to create the illusion of tactile sensations. Therefore, by controlling the properties of the fluid flow throughout areas of the mesh, different textures and shapes may be experienced by the user. In accordance with the illustrative embodiments, the mesh may be fashioned into one or more clothing items, such as a glove, a hat, a shirt, or any other configuration that would cover some or all of the user's body, with unobstructed access to the skin of the user.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
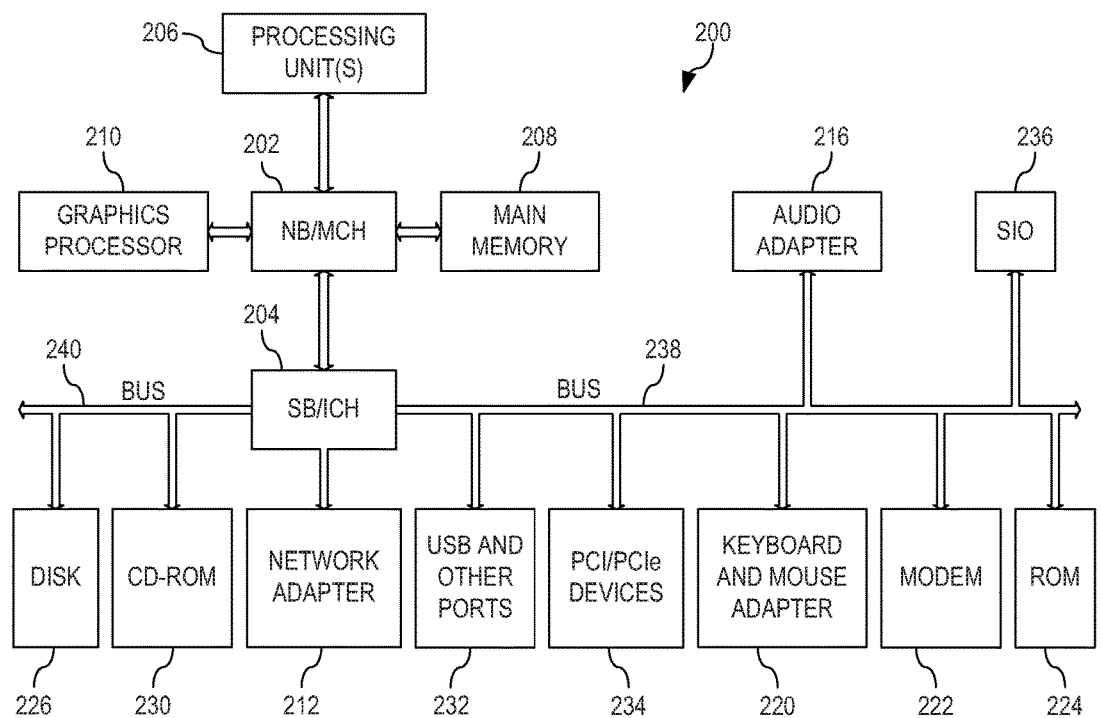
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet. Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a tactile display using electrostatic accelerators. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs for controlling a tactile display described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a tactile display using electrostatic accelerators.

As noted above, the mechanisms of the illustrative embodiments utilize specifically configured computing devices, or data processing systems, to perform the operations for a tactile display using electrostatic accelerators. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the tactile display using electrostatic accelerators.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
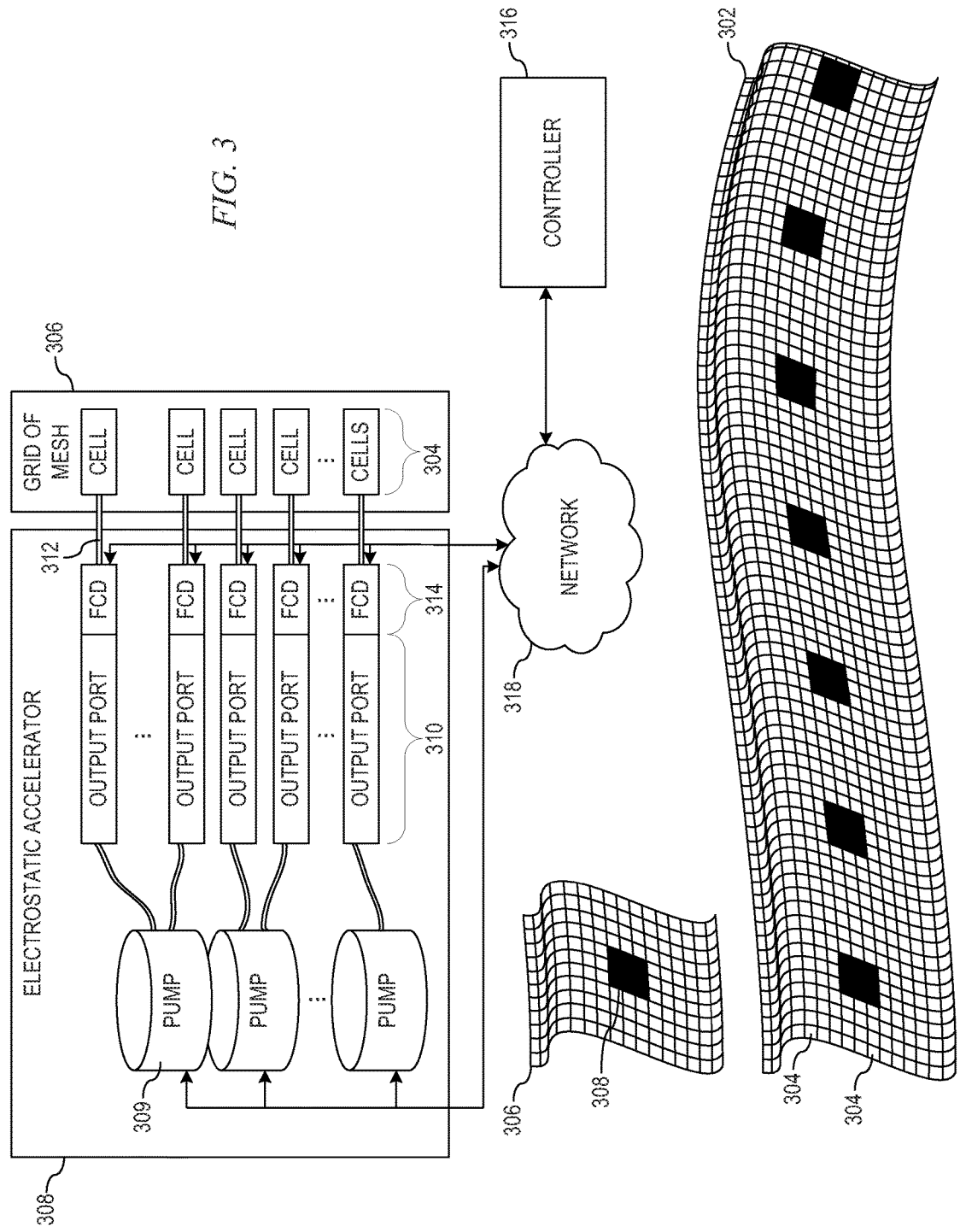
FIG. 3 depicts an exemplary tactile display controlled by a data processing system, such as data processing system 200 of FIG. 2, in accordance with an illustrative embodiment.

FIG. 3 depicts an exemplary tactile display controlled by a data processing system, such as data processing system 200 of FIG. 2, in accordance with an illustrative embodiment. As illustrated, tactile display 302 is a mesh fabric comprising a plurality of cells 304. The plurality of cells 304 is segmented into a set of grids 306 with each grid in the set of grids 306 having an associated electrostatic accelerator 308. Each electrostatic accelerator 308 is a device with one or more pumps 309 that pump a fluid, such as air, without any moving parts to the plurality of cells 304 within the grid to which the electrostatic accelerator 308 is associated. While the following is directed to airflow, the illustrative embodiments are not limited to only the flow of air. That is, other fluids may be pumped to selected cells or subsets of cells without departing from the spirit and scope of the invention. Instead of using rotating blades, as in a conventional fan, each of the one or more pumps 309 uses an electric field to propel electrically charged air molecules from air that is pulled in from an inlet port. The electric field may be generated between two plates that powered via low voltage directed current power source, such as from batteries, low voltage dc power supply, or the like. Because air molecules are normally neutrally charged, the electrostatic accelerator has to create charged molecules, or ions, first. This is performed in three steps in the fluid acceleration process: ionize air molecules, use those ions to push many more neutral molecules in a desired direction, and then recapture and neutralize the ions to eliminate any net charge.

In order to reduce the cumbersomeness of previously implemented tactile displays and in order to increase the resolution of tactile display 302, grids 306 of tactile display may be segmented such that pump 309, which may have a cross-sectional dimension in a range of 200 by 200 micrometers in an embodiment, of the associated electrostatic accelerator 308 provides the necessary air flow to the subset of cells within the grid to which pump 309 is associated. That is, each pump 309 is coupled to a set, e.g., one or more, of individually controllable output ports 310 each of which is coupled to a cell or subset of cells in the plurality of cells 304 in the grid via an associated pneumatic tube 312, thereby forming an open-loop system. That is, in various embodiments, each pneumatic tube 312 couples to an associated output port 310 on one end and to a cell 304 in the mesh fabric on the other end such that the pneumatic tube 312 penetrates the mesh from the outside but is flush with the mesh on the inside. By each pneumatic tube 312 penetrating the mesh from the outside but being flush with the mesh on the inside, air pumped from pump 309 is directed directly to the user without any fabric or material obstructing the airflow. In alternative embodiments, a fabric or material may obstruct the airflow pumped out from pneumatic tube 312. Pneumatic tube 312 may be manufactured out of material such as nylon, polyethylene, polyurethane, polyvinyl chloride (PVC), or the like. In one embodiment, controller 316, which is a data processing system such as data processing system 200 of FIG. 2, controls the airflow to a cell or subset of cells in the plurality of cells 304 in the grid by controlling the pump 309 associated with that cell or subset of cells. That is, by controlling a pump 309 coupled to a cell or subset of cells, controller 316 may control the airflow to that associated cell or subset of cells all at one time, providing a first level of granularity, as one example: 0% ionization or no air, 50% ionization or medium velocity airflow, or 100% ionization or full airflow. In this first embodiment, controller 316 may be coupled to each electrostatic accelerator 308 and thus each pump 309 via a connection through network 318, such as network 102 of FIG. 1.

In a second embodiment, rather than controlling the pumps 309 that supply the airflow to the plurality of cells 304 in the grid, controller controls the air flow to each cell by controlling each output port 310 via an associated flow control device (FCD) 314, such as a controllable valve, flap, gate, or the like. In the second embodiment, controller 316 may be coupled to each FCD 314 via a connection through network 318. Controlling the airflow using FCDs 314 provides a finer granularity, but may be slower than just controlling pumps 309.

Thus, controller 316 has the ability to control not only when air is provided to a particular cell or subset of cells in the plurality of cells 304 but also how much air is allowed to flow to the particular cell 304, when air is allowed to pass from pump 309 through an associated outlet port 310 to the particular cell 304 via pneumatic tube 312. That is, controller 316 is able to provide individual access to each cell or subset of cells in the plurality of cells 304 in each of the set of grids 306 in mesh 302, thereby providing a manipulation of airflow properties such as state, intensity, duration, pulse frequency, or the like.

By controlling each cell or subset of cells in the plurality of cells 304 in each of the set of grids 306 in mesh 302, controller 316 may instruct one or more cells to provide an individual airflow of such a state, intensity, duration, pulse frequency, or the like, that an illusion of tactile sensations may be sensed by nerve endings in the skin of a user to which the mesh is in contact. That is, controller 316 may operate such that information about a virtual three-dimensional (3D) object either at rest or in motion is sensed by nerve endings in the skin of a user to which mesh 302 is in contact with by controlling an individual airflow to one or more cells 304 thereby providing the illusion of being in contact with the virtual 3D object through tactile sensations being sensed by nerve endings in the skin of a user to which the mesh is in contact.

While controller 316 may provide the illusion of a virtual 3D object at rest may be controlled through manipulation of a state, intensity, duration, pulse frequency, or the like, of the individual airflow to the one or more cells 304 in mesh 302, providing the illusion of a virtual 3D object in motion may require sensory feedback. Therefore, controller 316 may utilize sensory information from one or more of motion sensors, position sensors, or the like, intertwined in mesh 302 so that controller 316 may update the output of the state, intensity, duration, pulse frequency, or the like, of the individual airflow to the one or more cells or subsets of cells in mesh 302 relative to the virtual 3D object in motion being touched. Examples of motion sensors may include: accelerometers, gyroscopes, compasses, barometers, or the like. Examples of position sensors may include: resistance-based or potentiometric position sensors, capacitive position sensors, linear voltage differential transformers, magnetostrictive linear position sensors, eddy current based position sensors, hall-effect based magnetic position sensors, fiber-optic position sensors, optical position sensors, or the like.

Because airflow to the one or more cells or subsets of cells in mesh 302 is electronically generated by pumps 309 in electrostatic accelerators 308, controller 316 and electrostatic accelerators 308 operate at a low latency so higher refresh rates could be achieved. That is, controller 316 and electrostatic accelerators 308 operate such that a minimum power density of 10 W/cm2 is achieved in order obtain an ideal tactile display solution. Power density (or volume power density or volume specific power) is the amount of power (time rate of energy transfer) per unit volume. In accordance with the illustrative embodiments, the mesh may be fashioned into one or more clothing items, such as a glove, a hat, a shirt, or any other configuration that would cover some or all of the user's body, with unobstructed access to the skin of the user.

Thus, controller 316 receives a selection of a three-dimensional (3D) object to be virtually rendered to a user. Controller 316 identifies a subset of cells of the plurality of cells 304 in each of the set of grids 306 in mesh 302 required to virtually render a portion of the 3D object that will be virtually contacted by mesh 302. Controller 316 sends a set of signals to a selected set of FCD 314 to a selected set of cells or subsets of cells for a 3D object to be virtually presented to a user wearing mesh 302. The set of signals sent by controller 316 controls the state, intensity, duration, pulse frequency, or the like, of air flow to each of the selected set of cells or subset of cells thereby providing the illusion of being in contact with the virtual 3D object through tactile sensations being sensed by nerve endings in the skin of a user to which mesh 302 is in contact.

FIGS. 4A and 4B depict examples of the illusions presented to a user of holding a virtual 3D object in accordance with the illustrative embodiments. In FIG. 4A illustrates a user is wearing glove 402 constructed of a tactile display, such as mesh 302 of FIG. 3. In this illustration, the user's hand is in glove 402 and the controller operates selected ones of the associated flow control devices associated with the selected ones of the cells within the tactile display of glove 402 being worn by the user such that the user's hand 406 is presented with the illusion that a corner 408 of cube 404 is being grasped. FIG. 4B also illustrates a user is wearing glove 412 constructed of a tactile display, such as mesh 302 of FIG. 3. In this illustration, the user's hand is in glove 412 and the controller operates selected ones of the associated flow control devices associated with the selected ones of the cells within the tactile display of glove 412 being worn by the user such that the user's hand 416 is presented with the illusion that a base 418 of sold cone cube 414 is being grasped. By coordinating fluid flow through the selected cells in the high-resolution tactile display of the illustrative embodiments, nerve endings in skin of the user to which the tactile display is in contact are stimulated to create the illusion of tactile sensations. Therefore, by controlling the properties of fluid flow throughout areas of the tactile display, different textures and shapes may be experienced by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
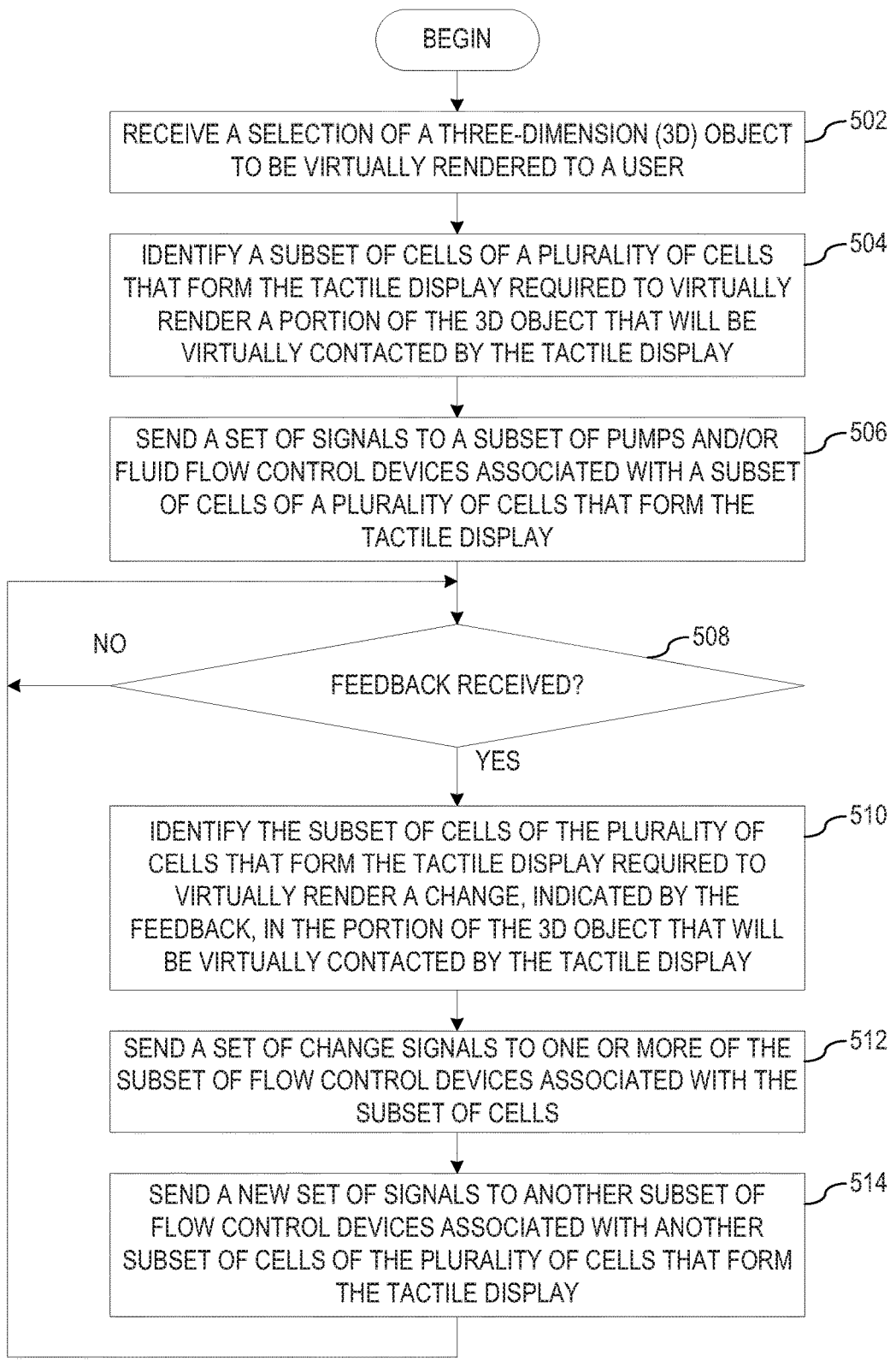
FIG. 5 depicts an exemplary flowchart of operations performed by a controller controlling a tactile display in accordance with an illustrative embodiment.

FIG. 5 depicts an exemplary flowchart of operations performed by a controller controlling a tactile display in accordance with an illustrative embodiment. As the operation begins, a controller receives a selection of a three-dimensional (3D) object to be virtually rendered to a user (step 502). The controller identifies a subset of cells of a plurality of cells that form the tactile display required to virtually render a portion of the 3D object that will be virtually contacted by the tactile display (step 504). The controller sends a set of signals to a subset of pumps and/or flow control devices associated with the subset of cells of a plurality of cells that form the tactile display (step 506). The set of signals controls one or more of a state, intensity, duration, pulse frequency, or the like, of a fluid flow to each of the subset of cells thereby providing the illusion of being in contact with the virtual 3D object through tactile sensations being sensed by nerve endings in the skin of a user to which tactile display is in contact. The controller then determines whether feedback from one or more sensors on the tactile display has been received (step 508). If at step 508 the controller determines that feedback has been received, then the controller identifies the subset of cells of the plurality cells that form the tactile display required to virtually render a change, indicated by the feedback, in the portion of the 3D object that will be virtually contacted by the tactile display (step 510). The controller then sends a set of change signals to one or more of the subset of flow control devices associated with the subset of cells to render a different sensation of the virtual 3D object on the skin of the user wearing the tactile display (step 512) as well as, if required, sends a new set of signals to another subset of flow control devices associated with another subset of cells of the plurality of cells that form the tactile display to render the different sensation of the virtual three-dimensional object on the skin of the user wearing the tactile display (step 514), with the operation returning to step 508 thereafter. If at step 508 the controller fails to identify any feedback, the operation returning to step 508.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a tactile display using electrostatic accelerators. The tactile display comprises a mesh with a plurality of cells segmented into grids, each grid with its own electrostatic accelerator that provides for an individual control of the flow of air to each cell in the grid via a pneumatic tube. A controller of the tactile display is then coupled to each electrostatic accelerator thereby providing individual access to each cell on the grid, thereby providing a manipulation of airflow properties such as state, intensity, duration and pulse frequency of air flow through individual cells simultaneously. By coordinating airflow through multiple individual cells, nerve endings in skin to which the mesh is applied are then stimulated to create the illusion of tactile sensations. Therefore, by controlling the properties of airflow throughout areas of the mesh, different textures and shapes may be experienced by the user. In accordance with the illustrative embodiments, the mesh may be fashioned into one or more clothing items, such as a glove, a hat, a shirt, or any other configuration that would cover some or all of the user's body, with unobstructed access to the skin of the user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein,

What is claimed is:

1. A tactile display comprising:
   a controller comprising a processor and a memory coupled to the processor, wherein the memory comprises instructions which, when executed by the processor, cause the processor to:
   receive a selection of a three-dimensional (3D) object to be virtually rendered to a user;
   identify a subset of cells of a plurality of cells that form the tactile display required to virtually render a portion of the 3D object that will be virtually contacted by the tactile display, wherein the tactile display is of a mesh composition forming the plurality of cells and wherein the mesh is segmented into a plurality of grids with each grid having a set of cells and an associated electrostatic accelerator; and
   selectively control a fluid flow to the subset of cells that form the tactile display to render a sensation associated with the portion of the 3D object on skin of the user wearing the tactile display, wherein the fluid flow to each cell the subset of cells is provided via one or more electrostatic accelerator pumps.

2. The tactile display of claim 1, wherein each electrostatic accelerator pump uses an electric field to propel electrically charged air molecules to the subset of cells thereby generating the fluid flow.

3. The tactile display of claim 1, wherein the fluid flow to each cell in the subset of cells is controlled by controlling each of the one or more electrostatic accelerator pumps providing the fluid flow to the subset of cells.

4. The tactile display of claim 1, wherein the fluid flow to each cell in the subset of cells is controlled via a flow control device between the cell and the electrostatic accelerator pump providing the fluid flow to the cell, wherein each flow control device is coupled to the associated cell via an associated pneumatic tube, and wherein the pneumatic tube is manufactured out of a material from a group consisting of nylon, polyethylene, polyurethane, and polyvinyl chloride (PVC).

5. The tactile display of claim 4, wherein the flow control device is a device from a group consisting of an electronically controlled valve, an electronically controlled flap, and an electronically controlled gate.

6. The tactile display of claim 1, wherein the controller controls the fluid flow to each cell in the subset of cells by manipulating at least one of a state, intensity, duration, or a pulse frequency of the fluid flow.

7. The tactile display of claim 1, wherein the tactile display forms an article of clothing that covers some or all of the user's body with unobstructed access to the skin of the user.

8. The tactile display of claim 1, wherein the tactile display further comprises at least one of a motion sensor or a position sensor that provides feedback to the controller thereby changing the output of fluid flow to the subset of cells in the plurality of cells that form the tactile display to render a different sensation of the virtual three-dimensional object on the skin of the user wearing the tactile display.

9. The tactile display of claim 8, wherein the feedback to the controller causes the processor to selectively control fluid flow to another subset of cells in the plurality of cells that form the tactile display to render the different sensation of the virtual three-dimensional object on the skin of the user wearing the tactile display.

10. A computer program product comprising a computer readable storage medium having a computer readable program stored therein, wherein the computer readable program, when executed on a computing device, causes the computing device to:
    receive a selection of a three-dimensional (3D) object to be virtually rendered to a user;
    identify a subset of cells of a plurality of cells that form the tactile display required to virtually render a portion of the 3D object that will be virtually contacted by the tactile display, wherein the tactile display is of a mesh composition forming the plurality of cells and wherein the mesh is segmented into a plurality of grids with each grid having a set of cells and an associated electrostatic accelerator; and
    selectively control a fluid flow to the subset of cells that form the tactile display to render a sensation associated with the portion of the 3D object on skin of the user wearing the tactile display, wherein the fluid flow to each cell the subset of cells is provided via one or more electrostatic accelerator pumps.

11. The computer program product of claim 10, wherein each electrostatic accelerator pump uses an electric field to propel electrically charged air molecules to the subset of cells thereby generating the fluid flow.

12. The computer program product of claim 10, wherein the fluid flow to each cell in the subset of cells is controlled by controlling each of the one or more electrostatic accelerator pumps providing the fluid flow to the subset of cells.

13. The computer program product of claim 10, wherein the fluid flow to each cell in the subset of cells is controlled via a flow control device between the cell and the electrostatic accelerator pump providing the fluid flow to the cell, wherein each flow control device is coupled to the associated cell via an associated pneumatic tube, and wherein the pneumatic tube is manufactured out of a material from a group consisting of nylon, polyethylene, polyurethane, and polyvinyl chloride (PVC).

14. The computer program product of claim 13, wherein the flow control device is a device from a group consisting of an electronically controlled valve, an electronically controlled flap, and an electronically controlled gate.

15. The computer program product of claim 10, wherein the controller controls the fluid flow to each cell in the subset of cells by manipulating at least one of a state, intensity, duration, or a pulse frequency of the fluid flow.

16. The computer program product of claim 10, wherein the tactile display further comprises at least one of a motion sensor or a position sensor that provides feedback to the controller thereby changing the output of fluid flow to the subset of cells in the plurality of cells that form the tactile display to render a different sensation of the virtual three-dimensional object on the skin of the user wearing the tactile display.

17. The computer program product of claim 16, wherein the feedback to the controller causes the processor to selectively control fluid flow to another subset of cells in the plurality of cells that form the tactile display to render the different sensation of the virtual three-dimensional object on the skin of the user wearing the tactile display.

18. A method, in a data processing system, for virtually rendering a portion of a three-dimensional (3D) object to a user via a tactile display, the method comprising:

receive a selection of the 3D object to be virtually rendered to a user;

identify a subset of cells of a plurality of cells that form the tactile display required to virtually render a portion of the 3D object that will be virtually contacted by the tactile display, wherein the tactile display is of a mesh composition forming the plurality of cells and wherein the mesh is segmented into a plurality of grids with each grid having a set of cells and an associated electrostatic accelerator; and selectively control a fluid flow to the subset of cells that form the tactile display to render a sensation associated with the portion of the 3D object on skin of the user wearing the tactile display, wherein the fluid flow to each cell the subset of cells is provided via one or more electrostatic accelerator pumps.

19. The method of claim 18, wherein the fluid flow to each cell in the subset of cells is controlled via a flow control device between the cell and the electrostatic accelerator pump providing the fluid flow to the cell, wherein each flow control device is coupled to the associated cell via an associated pneumatic tube, and wherein the pneumatic tube is manufactured out of a material from a group consisting of nylon, polyethylene, polyurethane, and polyvinyl chloride (PVC).

20. The method of claim 18, wherein the flow control device is a device from a group consisting of an electronically controlled valve, an electronically controlled flap, and an electronically controlled gate.

* * * * *